United States Patent [19]

Wirfelt

[11] Patent Number: 4,642,006
[45] Date of Patent: Feb. 10, 1987

[54] TOOL MOUNTING

[75] Inventor: Sven A. O. Wirfelt, N.-Liebersbach, Fed. Rep. of Germany

[73] Assignee: Santrade Limited, Lucerne, Switzerland

[21] Appl. No.: 735,763

[22] Filed: May 20, 1985

[30] Foreign Application Priority Data

May 25, 1984 [SE] Sweden .............................. 8402831

[51] Int. Cl.$^4$ .......................... B23C 7/00; B23B 43/00
[52] U.S. Cl. ....................................... 409/233; 29/568; 82/36 B; 408/239 A
[58] Field of Search ................ 82/36 B, 36 R, 37; 29/568; 409/233; 408/239 A, 35

[56] References Cited

U.S. PATENT DOCUMENTS

| | | | |
|---|---|---|---|
| 4,223,579 | 9/1980 | Stark et al. | 408/35 |
| 4,270,422 | 6/1981 | Andersson | 82/36 B |
| 4,406,195 | 9/1983 | Kruger et al. | 408/239 A |
| 4,521,950 | 6/1985 | Kase et al. | 29/568 |
| 4,580,472 | 4/1986 | Kastner | 409/233 |

FOREIGN PATENT DOCUMENTS

| | | | |
|---|---|---|---|
| 52023 | 5/1982 | European Pat. Off. | 29/568 |
| 0015248 | 7/1983 | European Pat. Off. | |
| 3318603 | 11/1984 | Fed. Rep. of Germany | 82/36 B |

Primary Examiner—Leonidas Vlachos
Attorney, Agent, or Firm—Burns, Doane, Swecker & Mathis

[57] ABSTRACT

A tool mounting between a cutting tool, for example a drill, and a machine spindle, comprising a tool element and a tightening device. The tool element consists of a body and an expandable attachment tap. The attachment tap is formed with grooves to receive a gripping implement of a tool interchanging mechanism and with a through opening to receive an end portion of a pull rod. The tightening device comprises a pull rod movably mounted in an inner pipe and forwardly projecting resilient portions. During changing to an other tool the opening at the attachment tap (13) is moved over the end portion by means of the gripping implement while a wall of the opening of the attachment tap slip against the resilient portions until a stop pin on the tool shank engages the end surface of the end portion and the resilient portions snap into recesses in the hole wall. The gripping implement is then lifted away and the attachment tap is retained in a pre-centered position whereafter the pull rod is tightened for clamping of the tool shank in the inner pipe during two further centering procedures.

21 Claims, 11 Drawing Figures

TOOL MOUNTING

BACKGROUND AND OBJECTS OF THE INVENTION

The present invention relates to a mounting between a cutting tool and a machine spindle, comprising a tightening device, provided to be a part of the machine spindle and a tool element arranged to be held by the tightening device, shaped to hold the cutting tool. Furthermore the invention relates to a tool element and tightening device being a part of the tool mounting.

The demand that interchanging of tools shall be done completely automatic has been increasingly accentuated and it has been developed different types of tool interchanging systems especially for numerically controlled machines. The tool elements are commonly of conical type and therefore the cone both centers the tool in the spindle and receives both radial and axial forces acting upon the tool. The tools are commonly transferred by means of a gripping arm, which engages a V-groove arranged adjacent to the conical guide on the part of the tool element which groove is situated just outside the front surface of the spindle. The V-groove therefore commonly is arranged in a portion which has a larger diameter than the base diameter of the cone.

During the recent years spindles for rotary tools have begun to be used also in lathes and therefore new demands have arisen concerning the shaping of the tool, the securing of the tool and the tool interchanging mechanism. By the fact that automatic interchanging of tools is becoming more and more common also in lathes due to the access to small, simple and mechanically interchangable tool units, demands arise that also the interchanging of the tools in the rotary spindles shall be automatic. A further demand is that the changes shall be made possible by means of the gripping appliances used for the lathe units and preferably by means of using of the same magazines as for these.

These demands cannot be met in a simple way when using the above-mentioned conventional tools having conical attachment because they are essentially different from the small lathe units.

The present invention concerning a tool mounting is provided to solve the above-mentioned problems. The characterizing features of the invention will be more closely defined in the following claims.

BRIEF DESCRIPTION OF THE DRAWINGS

The invention will more closely appear from the appended description and drawings in which:

FIGS. 1A and 1B show an end of a tool element or a tool shank according to the invention in an end view and a cross-sectional view, respectively, the cross-section taken along line I in FIG. 1a.

DETAILED DESCRIPTION OF A PREFERRED EMBODIMENT OF THE INVENTION

Figure 1A:
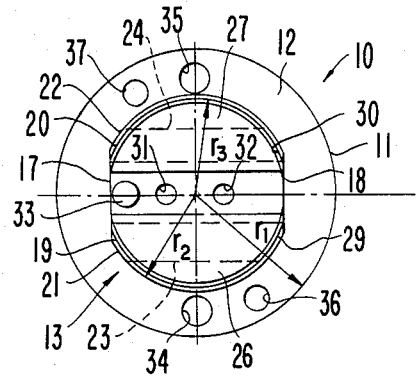
Figure 1B:
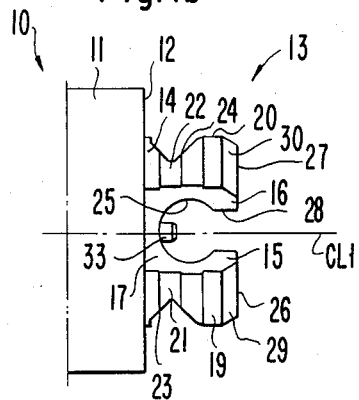

In FIGS. 1A and 1B one end of a tool element or a tool shank 10 is shown, comprising a body 11, an attachment portion and a tool. The tool which is not shown is situated in the other end of the tool body 11. The tool may be a milling cutter or a drill for example. The envelope surface of the tool body 11 terminates in an end surface 12 having a radius $r_1$, normal to a longitudinal axis CL1 of the tool. A guiding and attachment tap 13 projects from the center of the end surface 12. The attachment tap 13 is symmetrically arranged relative to the longitudinal axis CL1 of the tool element and consists of a gripping and supporting portion 14 and two protruding projections 15, 16. The attachment tap 13 has a cylindrical basic form, but has been machined such that it is arranged with two opposed plane-parallel surfaces 17, 18. Both the surfaces 17, 18 are parallel with the longitudinal axis CL1. The parts of the projections 15, 16 which are furthest away from the center line are part-cylindrically shaped and form primary centering surfaces 19, 20 whose radius $r_3$ is somewhat smaller than the radius $r_2$ of the secondary centering surfaces 21, 22 which define the largest circular periphery of the gripping portion 14. The secondary centering surfaces may also be part-conically shaped. The radius $r_1$ of the end surface 12 is at least 20% larger than the radius $r_2$ of the attachment tap 13. The gripping surfaces 21, 22 comprise V-shaped grooves 23, 24 which are to receive a gripping appliance of the tool changing mechanism and the surfaces 17, 18 are arranged for localization in a tool magazine of the machine. The grooves 23, 24 may also be provided in other shapes, for example U- or trapezi-shape. The tap 13 is provided with a through hole 25 which has been opened towards the end surfaces 26, 27 of the projections by means of a slot 28. The main axis of the hole 25 extends radially with respect to the longitudinal axis CL1. The end surfaces 26, 27 are provided with bevels 29, 30 at their lines of junction with the primary centering surfaces 19, 20 in order to facilitate the entering of the tap into a socket in a tightening device. The axially inner wall of the hole 25 is provided with two recesses 31, 32 in order to receive two rounded, longitudinally resilient projections 52, 53 arranged in a tightening device 38. Alternatively these resilient projections may be arranged in the longitudinally inner wall of the hole 25 while the recesses are arranged in the tightening device. The number of recesses or resilient portions may be one or more. The resilient portion in combination with the recess make it possible to interchange the element at all the turning positions without the tool element falling out of the tightening device. A stop pin 33 is arranged on the end surface 12, which pin projects from the hole wall mainly parallel with the longitudinal axis CL1. The stop pin 31 and the yieldable projections 52, 53 and holes 31, 32 define a positioning structure for locating the longitudinal axis CL1 in alignment with a longitudinal axis CL2 of a tightening device as will be explained below. The end surface 12 is provided with recesses 34, 35, which are to receive pins 44, 45 fastened in the tightening device. The end surface 12 is also provided with fluid passages 36, 37.

Figure 2A:
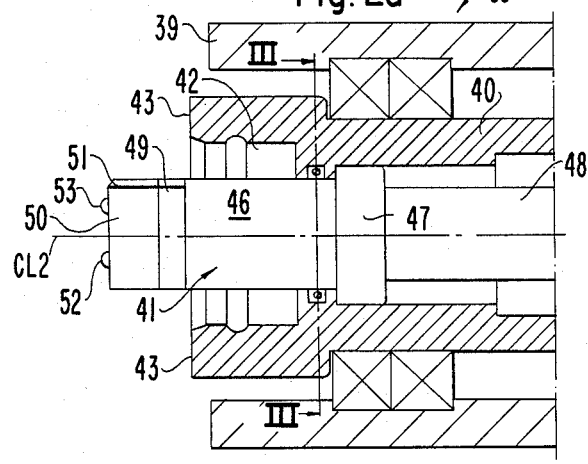
FIGS. 2A and 2B show cross-sections of a tightening device according to the invention in a change position in a side view and a top view, respectively.
Figure 2B:
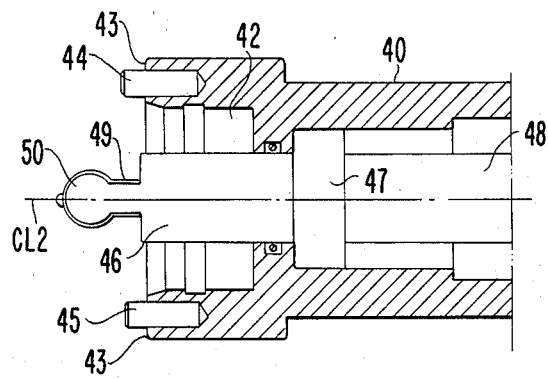

FIGS. 2A and 2B, the latter of which is a horizontal longitudinal sectional view of the assembly depicted in FIG. 2A, show a tightening device 38 in an interchanging position. The tightening device 38 comprises a housing 39, an inner pipe 40 and a pull rod or drawbar 41 displaceable therein. The inner pipe 40 encloses a cylindrical space or socket 42 and has an end surface 43 in which two pins 44, 45 are arranged. The inner pipe 40, which is a part of the machine spindle, is rotatably mounted in a bearing in the housing 39, shown in FIG. 2A only, which is rigidly secured to the machine. The spindle rotates about a longitudinal axis CL2. The pull rod 41 consists of a rectangular portion 46, which is connected to some sort of operating device (not shown) via a stop flange 47 and a rod 48. The rectangular portion 46 transforms via a flat, radially oblong neck 49 into a cylindrical, oblong head 50 forming a pull bolt. The head 50 and the neck 49 of the pull rod 41 have a bevel 51 at least at one of their ends, which facilitates the entrance of these into the hole 25 and slot 28 of the attachment tap 13. The front surface of the head 50 facing forwardly is provided with the two projections, preferably two spring-loaded balls 52, 53 arranged symmetrically about the longitudinal axis CL2 of the tightening device 38. Each ball is movably held by a recess in the head 50. A spring is forcing the ball out of the recess such that about half the ball at the most projects from said front surface.

Figure 3:
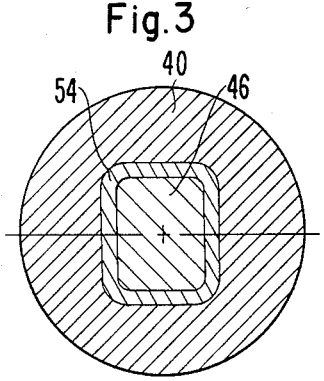
FIG. 3 shows a cross-section of the tightening device according to the line III—III in FIG. 2A.

FIG. 3 shows a cross-sectional view of the inner pipe 40 and the pull rod according to the line III—III in FIG. 2A. The inner pipe 40 has a circular circumference and it is provided with a mainly rectangular hole. The rectangular portion 46 of the pull rod is forwards and backwards movable through said hole. A sealing device 54 is arranged in the hole which seals around the rectangular portion 46.

Figure 4A:
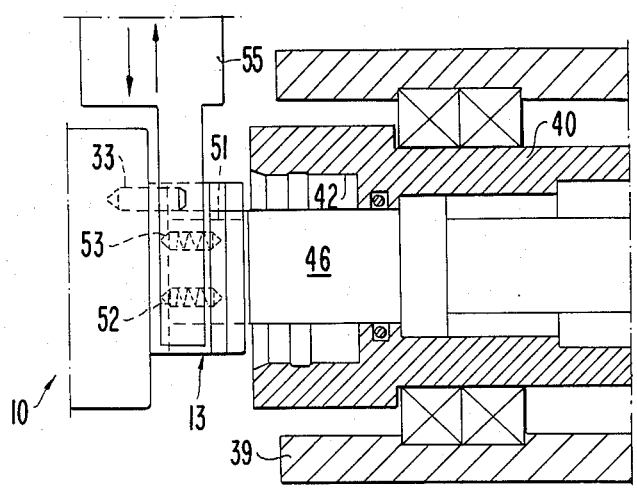
FIGS. 4A and 4B show cross-sections of a tool mounting according to the invention in a change position in a side view and a top view, respectively.
Figure 4B:
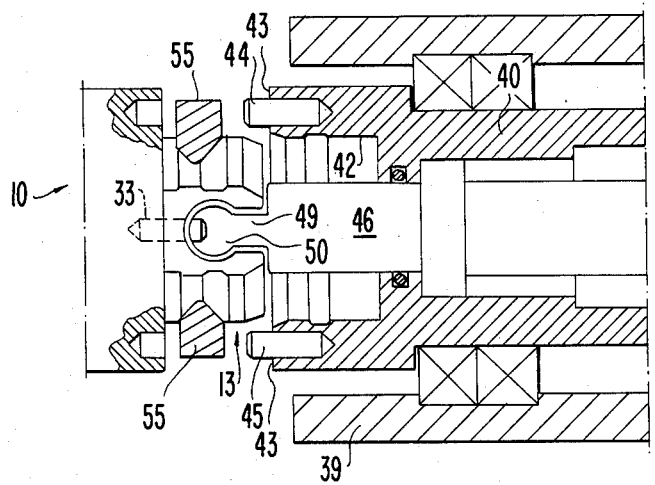

FIGS. 4A and 4B, which are cross-sectional views similar to FIGS. 2A and 2B, show the tool element and the tightening device at the tool interchanging position wherein the tap is disposed completely longitudinally outside of the housing 39, i.e., no part of the housing overlies the tap in any radial direction. A gripping implement 55 of the machine presses the attachment tap 13 of the tool element 10 down against the entering cone 51 of the head 50. The balls 52, 53 compress the respective spring during this pressing because the hole wall of the attachment tap 13 slides on the balls. The tool element is coarsely centered in radial direction by the abutment of the stop pin 33 against the upper end surface of the head 50. The balls will simultaneously snap into the corresponding recesses 31, 32 in the hole wall such that the gripping implement may be withdrawn. Alternatively, the stop pin 33 may be replaced by a resilient pin arranged in the center line, which projects into a recess in the front surface of the head 50 or such that the pin is provided in the head for projection into a recess in the tool shank. The tool element is coaxially aligned with the center line CL2 of the inner pipe 40 because of the sliding of the balls 52, 53 on the wall of the hole 25 so that the cylindrical attachment tap 13 finally may enter into the space 42 of the inner pipe.

Figure 5A:
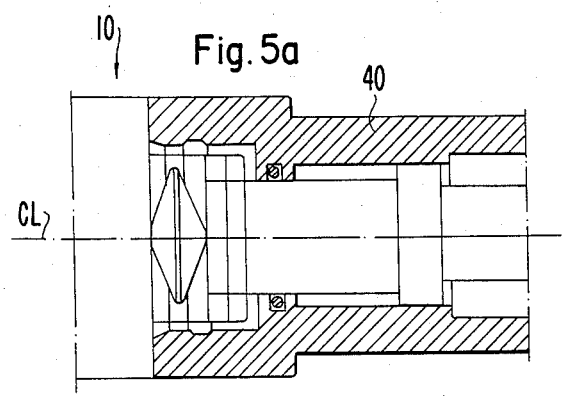
FIGS. 5A and 5B show cross-sections of the tool mounting in a working position in a side view and a top view, respectively.
Figure 5B:
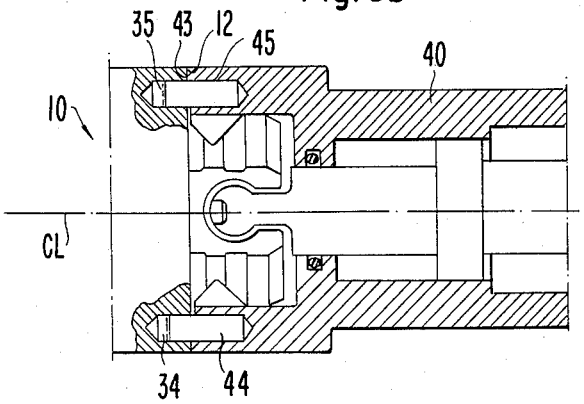

In FIGS. 5A, 5B, which are cross-sectional views similar to FIGS. 2A and 2B, the tool element 10 and the tightening device are shown in the secured or working position, wherein the pull rod 41 has been tightened. The projections 15, 16 which enclose the neck 49 and the head 50 will expand outwardly in the transversal direction of the tigthening device while being pulled by the pull rod 41 so that when the projections enter the inner pipe 40, the projections will be exposed to a reaction force directed transversely inwardly toward the longitudinal axis CL2 the inner piper 40 and therefore a safe connection free from play is achieved. The radially outward expansion of the tap occurs, because the head 50 defines a cam which acts against cam surfaces of the tap as defined by the wall of the hole 25 adjacent the slot 28. Also the end surface 12 is brought to abutment on the end surface 43 of the inner pipe 40 at the tightening which defines the axial position of the tool element. The pins 44, 45 are received by the recesses 34, 35 in the end surface 12 of the tool element.

Figure 6:
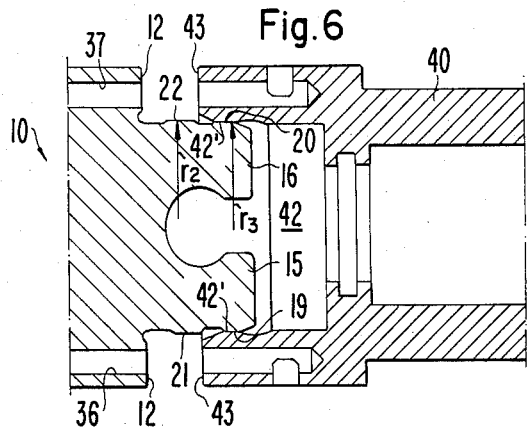
FIG. 6 shows a cross-section of the tool mounting in a mid-centered position.
Figure 7:
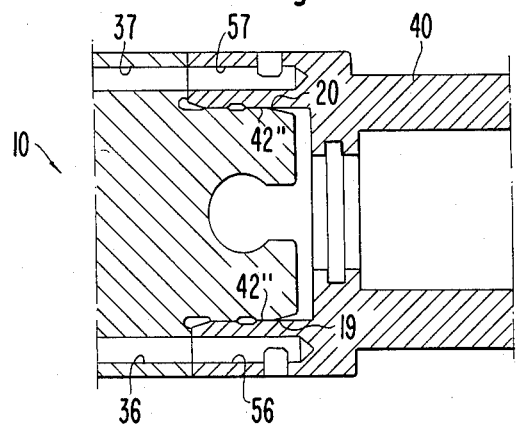
FIG. 7 shows a further cross-section of the tool mounting in a working position.

FIG. 6 shows a cross-section of the tool mounting mainly corresponding to the diagonal I in FIG. 1A but without the pull rod for ease of illustration only. The projections 15, 16 of the tool element 10 have been partly pulled into the inner pipe 40. The primary centering surfaces 19, 20 cause a mid-centering of the tool element 10 against a guiding surface 42' in the space 42 in the inner pipe 40. During a further pulling of the attachment tap 13 into the space 42, according to the working position shown in FIG. 7, the primary centering surfaces 19, 20 will slip fit into the complementary guiding surface 42'' in the space 42. The two peripheral, cylindrical guiding surfaces 42',42'' have different diameters complementary to the radii $r_2$, $r_3$ of the tap 13 and therefore jamming is avoided in spite of the fine fit. The inwards pulling also results in that the end surface 12 abuts against the end surface 43 of the inner pipe 40, which makes an expansion of the projections 15, 16 in the space 42 possible. The tool element 10 will therefore be secured to the spindle with freedom from play in a finally centered position. Fluid passages 56, 57 transfer fluid from the machine towards the tool via the fluid passages 36, 37 in the tool element 10.

Although the above described preferred embodiment comprises a pull rod having an end portion engaging the attachment tap, which is in the shape of a cylindrical, rounded enlargement it is to be understood that other alternative embodiments of the end portion of the pull rod are possible.

The described device is not limited for use only in rotary spindles but may with advantage be used also in stationary fastening devices, for example for fastening of lathe bars.

Thus, the invention relates to a tool mounting for a tool, which comprises a tool element or a tool shank and a tightening device arranged in the machine spindle. The tool mounting makes changes of tool units in a rotary spindle in a lathe possible with the same gripping appliances used for the lathe units and also use of the same magazines as for these.

I claim:
1. A tool assembly comprising
  (1) a tool element for carrying a cutter and including
    (1A) an annular tap projecting longitudinally outwardly from an end of said tool element, said tap defining a first longitudinal axis and including a pair of radially spaced projections defining therebetween a through-hole having an axis extending radially with respect to said longitudinal axis, said hole being open in a longitudinally outward direction by means of a slot formed between longitudinally outer ends of said projections, said hole including first cam surface means oriented to produce radially outward separation of said projections when acted upon in a longitu- dinally outward direction, said projections carrying circumferentially aligned radially outwardly facing centering surface means extending coaxially about said first longitudinal axis, and
  (1B) first positioning surface means,
(2) a housing,
(3) a tightening mechanism mounted in said housing for tightly securing said tool element, said tightening mechanism comprising:
  (3A) a rotary spindle mounted in said housing for rotation about a second longitudinal axis, said rotary spindle including wall means forming an annular socket which is coaxial with said second axis and open at one longitudinal end thereof, said socket sized to longitudinally receive said tap, said wall means including annular guiding surface means facing radially inwardly and arranged coaxially with respect to said second longitudinal axis at a radial spacing corresponding to that of said centering surface means,
  (3B) a drawbar mounted within said socket for longitudinal reciprocable movement relative to said wall means and constrained against rotational movement relative to said wall means, said drawbar including a head at an end thereof facing said open end of said socket, said head configured to be radially received in said hole of said tap, said drawbar being movable longitudinally to a tool exchange position in which said head positions said tap completely longitudinally outside of said housing such that no portion of said housing overlies said tap in any radial direction, said drawbar carrying:
    (3Bi) second positioning surface means engageable with said first positioning surface means when said first and second longitudinal axes are mutually aligned, to resist further radial movement between said tap and said head, and
    (3Bii) second cam surface means engageable with said first cam surface means to spread said projections radially apart, and
  (3C) means for reciprocating said drawbar and tool element between:
    (3Ci) a tool securing position within said socket such that said second cam surface means acts against said first cam surface means to pull said tap longitudinally within said socket while urging said projections radially outwardly to press said centering surface means firmly against said guiding surface means for mutually aligning said first and second longitudinal axes, and
    (3cii) said tool exchange position wherein said head and tap are situated longitudinally completely outside of said housing for radial exchange, and
(4) a gripping element movable in a radial direction toward and away from said head when said head is in said tool exchange position, said gripping element including means for gripping said tap for selectively moving said tap radially onto and from said head.

2. A tool assembly according to claim 1, wherein said centering surface means comprises longitudinally spaced first and second centering surfaces, each centering surface comprising circumferentially aligned portions formed on said projections, said first centering surface disposed closer to a longitudinally outer end of said tap than said second centering surface and having a smaller radius than said second centering surface, said guiding surface means comprising longitudinally spaced first and second guiding surfaces having radii corresponding to the radii of said first and second centering surfaces, respectively, and located to be engaged by said first and second centering surfaces when said tool element is secured in said socket.

3. A tool assembly according to claim 2, wherein said projections include circumferentially aligned, radially outwardly facing grooves extending coaxially relative to said first longitudinal axis and arranged to be gripped by said gripping means.

4. A tool assembly according to claim 1, wherein said first positioning surface means comprises a first stop surface carried by said tap and a second stop surface carried by said head, said stop surfaces coming into abutment to terminate further radial movement of said tap when said tool element is being inserted onto said head.

5. A tool assembly according to claim 4, wherein said first stop surface lies within said hole.

6. A tool assembly according to claim 5, wherein said second stop surface comprises an end face of said head.

7. A tool assembly according to claim 2, wherein said first positioning means comprises one of a spring-biased protrusion and a recess, said second positioning means comprising the other of said spring-biased protrusion and said recess, said protrusion entering said recess when said longitudinal axes are in mutual alignment.

8. A tool assembly according to claim 7, wherein said protrusion is carried by said head and said recess is disposed in said hole.

9. A tool assembly according to claim 7, wherein there are two said protrusions extending longitudinally on opposite sides of said second longitudinal axis.

10. A tool assembly according to claim 4, wherein said first stop surface lies within said hole.

11. A tool assembly according to claim 10, wherein said protrusion is carried by said head and said recess is disposed in said hole.

12. A tool assembly according to claim 11, wherein said first stop surface lies within said hole.

13. A tool assembly according to claim 1, wherein an end of said head which makes initial contact with said tap during insertion of said tool element onto said head is beveled to facilitate entry of said head into said hole.

14. A tool securing apparatus for securing a tool element of the type comprising a longitudinally extending, radially expandable annular tap having a radially extending hole therein, said tightening apparatus comprising:
  (1) a housing,
  (2) a rotary spindle mounted within said housing for rotation about a longitudinal axis, said spindle including an annular socket open at a longitudinal end thereof for receiving said tap of said tool element, said socket defined by an annular wall which includes a pair of longitudinally spaced, annular guiding surfaces oriented coaxially relative to said longitudinal axis, one of said guiding surfaces disposed closer to said open end of said socket and having a larger radius than the other guiding surface,
  (3) a drawbar mounted in said socket for longitudinal reciprocable movement therein relative to said wall, said drawbar constrained against rotation relative to said wall, said drawbar including a head disposed at a front end thereof, said head sized for entry within said hole of said tap in a direction which is radial relative to said axis, said head including:
(3A) cam means for engaging and expanding said tap radially outwardly in response to movement of said drawbar in a longitudinally inward direction tending to pull said tap into said socket, and
(3B) positioning means engageable with positioning means on said tap for defining therewith yieldable positioning means for yieldably positioning said tap in alignment with said longitudinal axis, and
(4) means for reciprocating said drawbar between
(4A) a tool securing position within said socket such that said cam means pulls said tap longitudinally within said socket while expanding said tap radially outwardly into firm engagement with said guiding surface means, and
(4B) a tool exchange position wherein said head and tap are disposed completely longitudinally outside of said housing to permit radial exchange of said tool element.

15. A tool securing apparatus according to claim 14, wherein said positioning means comprises a spring-biased protrusion carried by said head and engageable with a recess formed in said hole.

16. A tool securing apparatus according to claim 15, wherein there are two said spring-biased protrusions disposed on opposite sides of said longitudinal axis.

17. A tool securing apparatus according to claim 15, wherein said head is beveled at an end thereof which initially engages said tap when said tap is inserted onto said head, in order to facilitate entry of said head into said hole.

18. Tool element of the type which is to be secured within a rotary spindle by means of a drawbar which pulls the tool element into a socket of the spindle after the tool element has been mounted on the drawbar by a gripping member, said tool element comprising an annular tap projecting longitudinally outwardly from an end of said tool element, said tap defining a longitudinal axis and including a pair of radially spaced projections defining therebetween a through-hole having an axis extending radially with respect to said longitudinal axis, said hole being open in a longitudinally outward direction by means of a slot formed between longitudinally outer ends of said projections, said hole including cam surface means oriented to produce radially outward separation of said projections when acted upon in a longitudinally outward direction by said drawbar, said projections carrying first and second centering surfaces, said centering surfaces facing radially outwardly and each comprising circumferentially aligned surface portions on said projections, said first and second centering surfaces being longitudinally spaced along said tap and having first and second radii, respectively, the one of said centering surfaces disposed closer to a longitudinally outer end of said tap having a smaller radius than the other centering surface, said tap including a radially outwardly facing groove by which said tap may be engaged by a gripping member to be inserted onto or removed from said drawbar, said tap including positioning means engageable with corresponding positioning means on said drawbar when said tap reaches a predetermined position thereon for resisting further radial movement of said tap.

19. A tool element according to claim 18, wherein said positioning means comprises a stop pin disposed in said hole to contact said drawbar.

20. A tool element according to claim 19, wherein said positioning means comprises recesses formed in said hole and positioned to be engaged by protrusions formed on said drawbar.

21. A tool element according to claim 18, wherein said positioning means comprises recesses formed in said hole and positioned to be engaged by protrusions formed on said drawbar.

* * * * *